US010661553B2

United States Patent
Hsieh et al.

(10) Patent No.: US 10,661,553 B2
(45) Date of Patent: May 26, 2020

(54) SLICING METHOD FOR 3D COLORED OBJECT, UPDATING METHOD FOR SLICING DATA, AND PRINTING SYSTEM FOR USING THE SAME

(71) Applicants: XYZPRINTING, INC., New Taipei (TW); KINPO ELECTRONICS, INC., New Taipei (TW)

(72) Inventors: Hsin-Ta Hsieh, New Taipei (TW); Ko-Wei Shih, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 341 days.

(21) Appl. No.: 15/922,368

(22) Filed: Mar. 15, 2018

(65) Prior Publication Data

US 2019/0168499 A1    Jun. 6, 2019

(30) Foreign Application Priority Data

Dec. 6, 2017   (CN) .......................... 2017 1 1275815

(51) Int. Cl.
*B33Y 10/00*    (2015.01)
*B33Y 50/00*    (2015.01)
(Continued)

(52) U.S. Cl.
CPC .............. *B33Y 50/02* (2014.12); *B29C 41/36* (2013.01); *B29C 64/112* (2017.08);
(Continued)

(58) Field of Classification Search
CPC ....... B33Y 10/00; B33Y 50/00; B29C 64/112; B29C 64/386; B29C 41/36; G06T 19/20; H04N 1/50; H04N 1/52
See application file for complete search history.

(56) References Cited

U.S. PATENT DOCUMENTS 9,919,548 B1 *   3/2018 Yuan ...................... B33Y 10/00
2002/0167101 A1 * 11/2002 Tochimoto ............ B29C 64/112
                                                  264/40.1
(Continued)

FOREIGN PATENT DOCUMENTS

EP          3220623 A1   9/2017
JP       2017516679 A    6/2017
(Continued)

OTHER PUBLICATIONS

Alan Brunton et al: "Pushing the Limits of 3D Color Printing", ACM Transactions on Graphics (TOG), vol. 35, No. 1, Dec. 1, 2015, pp. 1-13, XP055366828, US ISSN:0730-0301, DOI: 10.1145/2832905, the whole document.
(Continued)

*Primary Examiner* — Ronald D Hartman, Jr.
(74) *Attorney, Agent, or Firm* — Chun-Ming Shih; HDLS IPR Services

(57) ABSTRACT

A processor imports a 3D object, performs a 3D route slicing on the 3D object for generating printing routes respectively corresponding to printing layers of the 3D object, and performs a 2D image slicing on the 3D object for generating image files corresponding to each printing layer. The processor stores one printing route of one printing layer into a route file; stores a jetting command of the image files of the same printing layer into the route file; and stores a jetting route of the same printing layer into the route file. The processor, according to a slicing order of the multiple printing layers, stores the printing route, the jetting command, and the jetting route of each printing layer respectively into the route file, so as to complete record the route file and then outputs the route file and the multiple image files.

15 Claims, 8 Drawing Sheets

(51) Int. Cl.
*B29C 64/112* (2017.01)
*B33Y 50/02* (2015.01)
*G06T 19/20* (2011.01)
*H04N 1/50* (2006.01)
*B29C 41/36* (2006.01)
*B29C 64/386* (2017.01)
*H04N 1/52* (2006.01)

(52) U.S. Cl.
CPC ............ *B29C 64/386* (2017.08); *B33Y 10/00* (2014.12); *B33Y 50/00* (2014.12); *G06T 19/20* (2013.01); *H04N 1/50* (2013.01); *H04N 1/52* (2013.01); *B29K 2995/0021* (2013.01); *G06T 2219/2012* (2013.01)

(56) References Cited

U.S. PATENT DOCUMENTS

| | | | | |
|---|---|---|---|---|
| 2004/0112523 | A1* | 6/2004 | Crom | B29C 67/00 |
| | | | | 156/290 |
| 2010/0195122 | A1* | 8/2010 | Kritchman | B41M 7/0027 |
| | | | | 358/1.9 |
| 2014/0151980 | A1* | 6/2014 | Ziebert | B62D 63/06 |
| | | | | 280/504 |
| 2014/0257549 | A1* | 9/2014 | Swartz | B29C 64/386 |
| | | | | 700/119 |
| 2016/0096318 | A1* | 4/2016 | Bickel | B29C 64/106 |
| | | | | 264/40.1 |
| 2016/0297150 | A1 | 10/2016 | Ueda | |
| 2018/0189618 | A1* | 7/2018 | Huang | B29C 64/118 |
| 2018/0200955 | A1* | 7/2018 | Hoelldorfer | B29C 64/20 |
| 2018/0290382 | A1* | 10/2018 | Ho | B29C 64/106 |
| 2019/0024634 | A1* | 1/2019 | Tarnowski | H02J 3/386 |

FOREIGN PATENT DOCUMENTS

| | | |
|---|---|---|
| TW | 200903378 A | 1/2009 |
| TW | 201144087 A | 12/2011 |
| WO | 2016132672 A1 | 8/2016 |
| WO | 2017123681 A1 | 7/2017 |

OTHER PUBLICATIONS

Search Report dated Nov. 7, 2018 of the corresponding European patent application.
Office Action dated Aug. 14, 2019 of the corresponding Korean patent application.
Office Action dated Sep. 4, 2019 of the corresponding Taiwan patent application.

* cited by examiner

SLICING METHOD FOR 3D COLORED OBJECT, UPDATING METHOD FOR SLICING DATA, AND PRINTING SYSTEM FOR USING THE SAME

BACKGROUND OF THE INVENTION

1. Technical Field

The technical field relates to a 3D object, especially to a slicing method for 3D colored object, an updating method for slicing data and a printing system using the slicing data.

2. Description of Related Art

Due to the well-development of 3D printing technology, and the size-down together with cost down of 3D printer, the 3D printers become more and more popular these years. To gain more market acceptance, some manufactures have developed 3D printer capable of printing 3D colored model.

The above-mentioned 3D printer generally has two print heads, namely, 3D print head for extruding forming material to print 3D object and 2D print for jetting color ink to color the 3D object. The above-mentioned 3D print head and 2D print head are based on different technologies; therefore, the related art 3D printer uses separate control and management for the two print heads.

More specifically, the related art 3D printer uses computer to perform slicing and then generate route file and image files. During printing, the 3D controls the 3D print head to move and extrude forming material based on the route file, and controls the 2D print to jet color ink based on the image file. However, the performance of the 3D printer is greatly degraded due to no relevance between the route file and the image file.

As an example, due to the separate control for the 3D print head and 2D print head of the 3D printer, non-synchronous problem might happen during printing. The 2D print head does not have the information about the size of the printed 3D object during coloring operation. Therefore, the processor is forced to set the image files for each printing layer to have the same dimension during the slicing operation to generate the image files. This will result in image files with large size and the memory space of the 3D printer is wasted.

As another example, the user may only modify the color of a 3D object while the structure and the outline of the 3D object are not changed. In related art 3D printer, the generation and employment of the route file and image file are separate. The processor needs to re-execute complete slicing for the modified 3D object to generate new route file and new image file when user modifies the 3D object (for example, changing the color of the 3D object). This causes more and wasteful slicing time for the processor.

SUMMARY OF THE INVENTION

The disclosure is directed to a slicing method for 3D colored object, an updating method for slicing data, and a printing system using the slicing data. The jetting related data of 2D print head is stored in route file of the 3D print head during slicing of the 3D object, thus facilitate the printing operation of the 3D printer and the updating of the slicing data for the processor.

According to one of the exemplary embodiments, the slicing method for 3D colored object comprises following steps: a) importing a 3D file through a processor, the 3D file storing a 3D object; b) the processor performing a 3D route slicing for the 3D object to generate a plurality of printing routes corresponding to a plurality of printing layers; c) the processor performing a 2D image slicing for the 3D object to generate a plurality of image files corresponding to the plurality of printing layers, where each of the printing layers is corresponding to one or more image files; d) the processor storing the printing route of one of the printing layers in a route file; and e) after the step d), the processor storing a jetting command for one or more image files of the one of the printing layers in the route file, and storing a jetting route of the selected one printing layer in the route file.

According to another one of the exemplary embodiments, the update method for slicing data of a 3D colored object comprises following steps: a) the processor receiving a modification command to modify a color data of the 3D object and to generate a modified 3D object; b) the processor performing the 2D image slicing for the modified 3D object to generate a plurality of modified image files for the plurality of printing layers, wherein each of the printing layers is corresponding to one or more modified image files; c) the processor obtaining the route file for the 3D object; d) the processor updating the jetting command and the jetting route in the route file based on one or more modified image files for one of the printing layers; e) after the step d), the processor determining whether data of all printing layers in the route file are updated; f) before the data of all printing layers in the route file are updated, the processor performing the step d) for next printing layer based on a slicing order; g) after the data of all printing layers in the route file are updated, the processor outputting the updated route file and the plurality of modified image files.

According to still another one of the exemplary embodiments, the printing system comprises:

a processing device configured to import a 3D file storing a 3D object, the processing device configured to perform 3D route slicing for the 3D object to generate a plurality of printing routes respectively corresponding to the plurality of printing layers, and to perform a 2D image slicing for the 3D object to generate a plurality of image files corresponding to the plurality of printing layers, the processing device configured to store the printing route of a one of the printing layers in a route file, and store a jetting command of one or more image files for the one of the printing layers in the route file, and store a jetting route of the one of the printing layers in the route file; and a printing device having communication with the processing device, the printing device having a 3D print head and a 2D print head, wherein in a printing operation, the printing device is configured to read the printing route for the printing layer from the route file and to control the 3D print head to move and print based on the printing route such that a slicing object corresponding to the printing layer is generated;

wherein in a coloring operation, the printing device is configured to read the jetting command and the jetting route for the printing layer from the route file and to verify and read one or more image files for the one of the printing layers based on a content of the jetting command, the printing device is configured to control the 2D print head to jet ink and to move to a ink-jetting destination marked in the jetting route based on one or more image files for the one of the printing layers.

In comparison with the related art 3D printer, the present disclosure records the jetting-related data of 2D print head to the route file of the 3D print head to facilitate the control and management of 2D print head and 3D print head during printing operation of the processor. Moreover, after the color of the 3D object is modified by user, the processor only needs to re-execute 2D image slicing (the 3D route slicing is not needed) to generate new image file(s) and uses the new image file to update the current route file, thus greatly saving the spent tome of re-executing slicing for processor.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

The present disclosure discloses a slicing method for 3D colored object (hereinafter, slicing method), which performs slicing for the edited 3D colored object and generates corresponding slicing data (for example, the below printing route, image file, jetting route and so on). The slicing data generated by above-mentioned slicing method can be applied to the 3D printer shown in FIG. 1.

Figure 1:
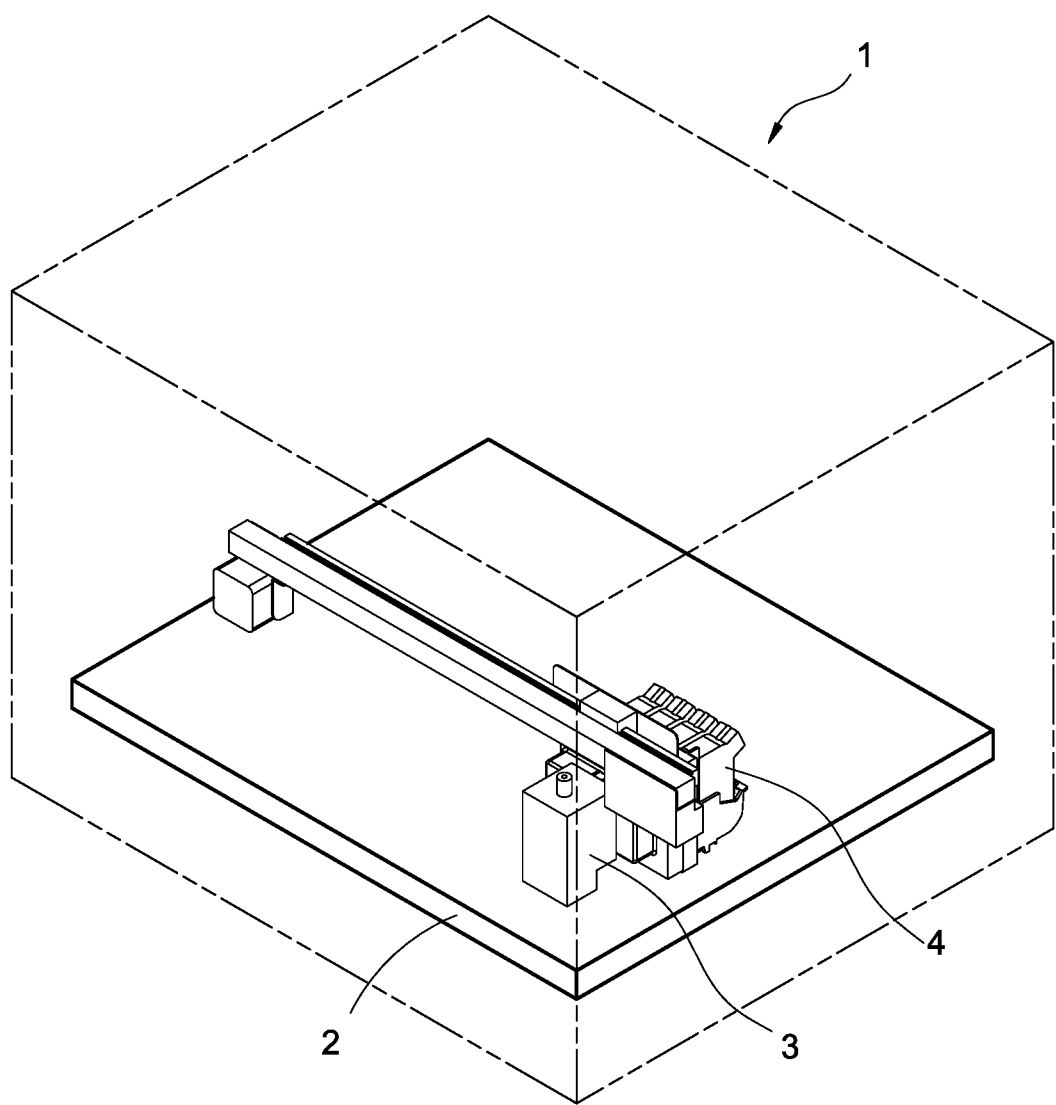
FIG. 1 is a schematic view for a 3D printer according to a first embodiment of the present disclosure.

FIG. 1 is a schematic view for a 3D printer according to a first embodiment of the present disclosure. The 3D colored printer 1 (hereinafter, 3D printer) mainly comprises a print platform 2, a 3D print head 3 and a 2D print head 4. The 3D print head 3 functions to extrude forming material (material for forming the 3D object) on the print platform 2, thus print the 3D object. The 2D print head 4 functions to jet (spread) color ink to color the 3D object printed by the 3D print head 3. The 3D printer 1 may use the 3D print head 3 and the 2D print head 4 to print a 3D colored model corresponding to above mentioned 3D colored object, after importing the slicing data generated by above-mentioned slicing method.

Figure 2:
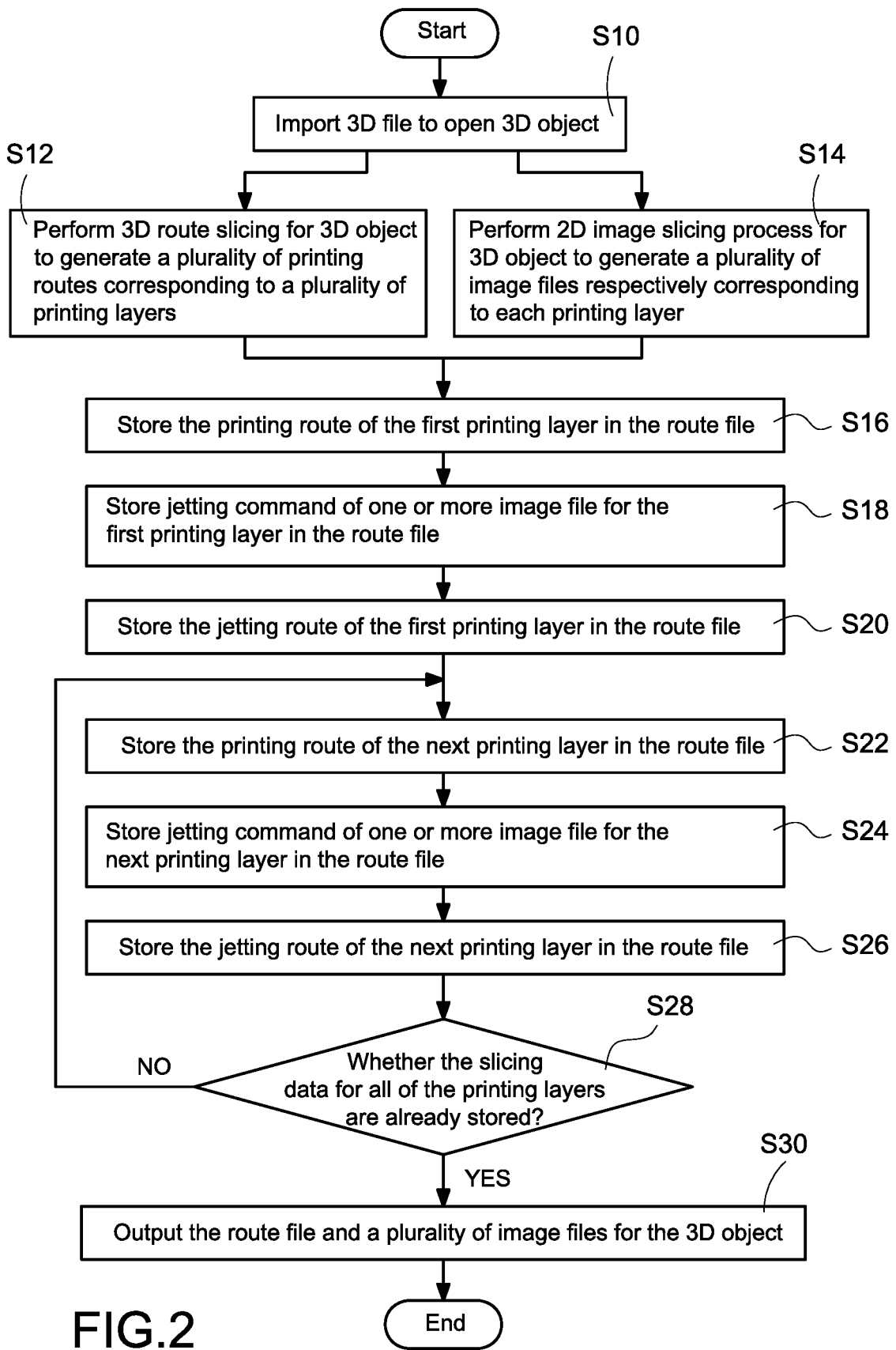
FIG. 2 shows the flowchart of slicing process for the first embodiment of the present disclosure.

The above-mentioned 3D printer 1 is exemplified with 3D Fused Deposition Modeling (FDM) printer. The slicing data (such as below route file) generated by the above-mentioned slicing method is used to control the movement route of the 3D print head of the 3D printer. Therefore, any printer, which relies on the control of 3D print head movement to achieve printing process, can be applied to the method of the present disclosure; and the present disclosure is not limited to the application for 3D FDM printer, FIG. 2 shows the flowchart of slicing process for the first embodiment of the present disclosure. Before printing the 3D color model with the 3D printer 1, user needs to edit the above-mentioned 3D object by computer or other 3D drawing equipment, and then stores the edited 3D object as processor-readable 3D file. The processor is, for example but not limited to, processor for computer, 3D printer 1 or other electronic equipment.

In the slicing method of the present disclosure, the processor first imports 3D file (step S10) to open the 3D object stored in the 3D file. The 3D file is, for example, imported to the processor by user through transmission schemes such as Wi-Fi, Bluetooth, or USB interface, or through Internet. However, the above specific description is not limitation for the present disclosure.

After step S10, the processor performs slicing for the 3D object to generate slicing data for a plurality of printing layers of the 3D object. The definition of the printing layer is well known in this art and the detail of slicing layer is not stated here for brevity.

More particularly, after opening the 3D object, the processor performs 3D route slicing for the 3D object to generate a plurality of printing routes corresponding to a plurality of printing layers (step S12). In this embodiment, each of the printing layers (for example, there are 1000 layers) is respectively corresponding to one printing route. During printing, the 3D printer 1 controls the 3D print head 3 based on the plurality of printing routes to respectively print the slicing object corresponding to each printing layer. The processor further performs 2D image slicing for 3D object to generate a plurality of image files respectively corresponding to each printing layer (step S14).

More particularly, the user may set a slicing thickness for the processor in advance. In the above-mentioned step S12 and S14, the processor may perform 3D route slicing and 2D image slicing based on the slicing thickness, thus generate a predetermined amount of printing layers, where each of the printing layers has the same thickness (or referred to as layer height).

Based on the color of the 3D object, the processor may respectively generate one or more image files for each printing layer. In one embodiment, each printing layer is corresponding to at least one image file and may be corresponding to at most four image files. For example, the first printing layer may be corresponding to only one image file (such as black image file), while the second printing layer may be corresponding to four image files (such as cyan, magenta, yellow, and black image files).

It should be mentioned that when one printing layer is corresponding to multiple image files (such as four image files), the image files may have the same dimension. On the other hand, different printing layer may be corresponding to image files with the same file size or different dimensions.

In this embodiment, the processor may selectively perform 3D route slicing or 2D image slicing in advance, or perform 3D route slicing and 2D image slicing at the same time in multiplexing way. However, the above specific description is not limitation for the present disclosure. In other word, the present disclosure does not limit the execution order of the steps S12 and S14.

After the steps S12 and S14, the processor already gets the printing route for each printing layer and one or more image files corresponding to each printing layer. The processor then generates a route file (such as the route file 5 shown in FIG. 3). In one embodiment, the route file is G-code file. The 3D printer 1 may read the G-code file and then control the 3D print head.

Afterward, the processor obtains the printing route of the first printing layer in the plurality of printing layers and stores the printing route of the first printing layer in the route file (step S16). In this embodiment, the first printing layer has the lowest position among the plurality of printing layers. However, the above specific description is not limitation for the present disclosure.

After step S16, the processor further stores the jetting command of one or more image files for the first printing layer in the route file (step S18). For example, if the first printing layer has only black image file, the processor only stores jetting command of black image file in the route file in step S18, namely, the 3D printer 1 knows that the first printing layer only needs to be jetted with black ink after the 3D printer 1 reads the route file. For a further example, if the first printing layer has both cyan and black image files, the processor stores jetting command of both cyan and black image files in the route file in step S18.

Moreover, the processor stores the jetting route of the first printing layer in the route file (step S20).

More particularly, the processor generates the jetting route for each printing layer based on the dimension of one or more image files for each printing layer during the 2D image slicing in step S14. In step S20, the processor stores the jetting route of the first printing layer in the route file and corresponding to the data entry of the first printing layer.

In another embodiment, the processor may ensure jetting range for each printing layer based on one or more image files for each printing layer during the 2D image slicing in step S14, and then respectively sets the jetting route for each printing layer based on the jetting ranges. In step S20, the processor stores the jetting route of the first printing layer in the route file and corresponding to the data entry of the first printing layer.

When all of the slicing data (namely, the above printing route, jetting command, and jetting route) for the first printing layer are stored, the processor stores the printing route for next printing layer (for example, the second printing layer) in the route file (step S22), stores the jetting command of one or more image files for the next printing layer in the route file (step S24) and stores the jetting route for the next printing layer in the route file (step S26).

After step S26, the processor determines whether all of the slicing data for the plurality of printing layer, which are generated in steps S12 and S14, are already stored (step S28). The process re-executes steps S22 to S26 for the next printing layer (such as the third printing layer) before the slicing data for all of printing layer are stored. Therefore, the slicing data for the next printing layer is stored in the same route file.

It should be noted that, in one embodiment of the present disclosure, the processor executes the steps S22 to S26 following a slicing order, namely, from the second printing layer to the third printing layer, and then to the fourth printing layer, and so on, until the slicing data for all printing layers are stored in the same route file.

After all of the slicing data for the plurality of printing layer are stored, the processor finishes this slicing process and outputs the route file and a plurality of image files for the 3D object in step S30.

Figure 3:
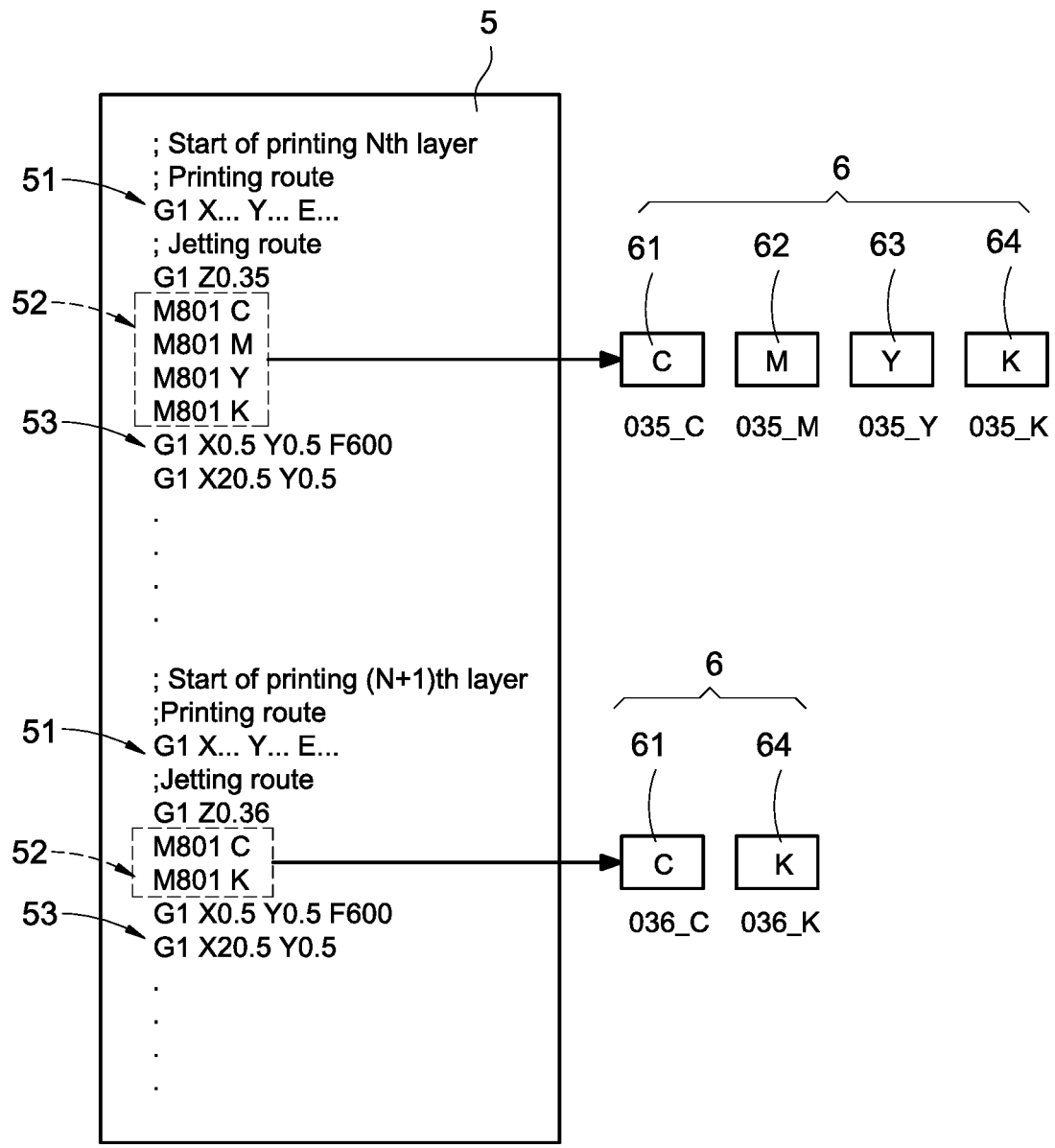
FIG. 3 shows the schematic view of the route file according to the first embodiment of the present disclosure.

With reference also to FIG. 3, this figure shows the schematic view of the route file according to the first embodiment of the present disclosure. As shown in FIG. 3, the route file 5 contains the slicing data for each slicing layer. In one embodiment, the route file stores the slicing data for each printing layer based on the slicing order, where the slicing data comprises at least the printing route 51, the jetting command 52 and the jetting route 53.

In the embodiment of FIG. 3, the Nth layer has four image files 6, which include the cyan image file 61, the magenta image file 62, the yellow image file 63, and the black image file 64. In FIG. 3, the label "C" represents the cyan image file 61, the label "M" represents the magenta image file 62, the label "Y" represents the yellow image file 63, and the label "K" represents the black image file 64.

The plurality of image files 6 respectively stores the corresponding layer-number mark, for example, the layer-number mark for the Nth layer is 035. In the steps S18 and S24 of FIG. 2, the processor may further store the jetting height for each printing layer in the corresponding data entry of the route file 5. In this embodiment, the corresponding data entry of the Nth layer in the route file is stored with "G1 Z0.35", it means the jetting height for the Nth layer is 0.35 mm. Besides, the jetting height is mainly corresponding to the layer-number mark of one or more image files 6 in this printing layer.

Taking the route file 5 in FIG. 3 as example, when the 3D printer 1 is to print the Nth layer, the 3D printer 1 may know that the jetting height for the Nth layer is 0.35 mm based on the information of data entry "G1 Z0.35", where the jetting height is corresponding to the Z axis height of the 3D printer 1. Therefore, the 3D printer 1 will read the four image files 6 with layer-number mark of 035_C, 035_M, 035_Y, and 035_K when performing the coloring process.

When the 3D printer 1 is to print the (N+1)th layer, the 3D printer 1 may know that the jetting height for the (N+1)th layer is 0.36 mm based on the information of data entry "G1 Z0.36". Therefore, the 3D printer 1 will reads the two image files 6 with layer-number mark of 036_C and 036_K when performing the coloring process, namely, the (N+1) layer has only two image files 6 corresponding to cyan and black colors. In other word, the 3D printer 1 does not need to jet ink of magenta and yellow colors when performs coloring process for the (N+1) layer.

In the steps S18 and S24 shown in FIG. 2, the processor already stores the jetting commands 52 for one or more image files 6 in each printing layer to the corresponding data entry of the route file 5. As shown in FIG. 3, the route file 5 already stores the four jetting commands 52 (namely, M801 C, M801 M, M801 Y, and M801 K in corresponding data entry of the Nth printing layer. It means that during printing the Nth printing layer, the 3D printer 1 needs to refer to the cyan image file 61, the magenta image file 62, the yellow image file 63, and the black image file 64 for the Nth layer at the same time in order to control the 2D print head 4 to jet cyan ink, magenta ink, yellow ink and black ink. In this embodiment, the jetting command for the 3D printer is represented by, for example but not limited to, the command "M801".

For another example, the route file 5 in FIG. 3 only stores two jetting commands 52 (namely, M801 C and M801 K) in the corresponding data entry for the (N+1) printing layer. It means that during printing the (N+1)th printing layer, the 3D printer 1 needs to refer only to the cyan image file 61 and the black image file 64 for the (N+1)th layer at the same time in order to control the 2D print head 4 to jet cyan ink and black ink. In other word, the jetting of magenta ink and yellow ink is not necessary for the coloring of the (N+1) printing layer.

In the steps S20 and S26 shown in FIG. 2, the processor already stores the jetting route 53 for each printing layer in the corresponding data entry in the route file 5. In one embodiment, the jetting route 53 may include the jetting start point (jetting origin) and jetting destination in the one or more image files 6 for each printing layer.

As shown in FIG. 3, the route file 5 already stores the jetting start point G1 X0.5 Y0.5 and the jetting destination G1 X20.5 Y0.5 in corresponding data entry of the Nth printing layer. It means that, when performing the coloring for the Nth printing layer, the 3D printer 1 uses the X-Y coordinate (5, 5) thereof as the jetting origin and the X-Y coordinate (20, 5) thereof as the jetting destination, thus control the jetting operation of the 2D print head 4.

In another embodiment, the jetting route also includes the jetting movement speed for each printing layer.

As shown in FIG. 3, the route file 5 already stores the jetting movement speed F600 in corresponding data entry of the Nth printing layer. It means that, when performing the coloring for the Nth printing layer, the 3D printer 1 controls the 2D print head 4 to move with the speed of 600 (the unit of speed is not limited in the present disclosure).

By using the route file 5 in FIG. 3, the 3D printer 1 may first control the 3D print head 3 to print a slicing object on a printing layer based on the printing route 51 and then obtains the jetting information for the 2D print head 4 from the same route file 5 as the printing route 51, thus control the operation of the 2D print head 4. On the contrary, in related art 3D printer, the 2D print head 4 is controlled to jet ink only by image file 6 corresponding to each printing layer. The route file 5 according to the present disclosure may optimize the control and management of 3D print head 3 and 2D print head 4 for the 3D printer 1 and enhance the printing quality of the printed 3D model (not shown).

Figure 4:
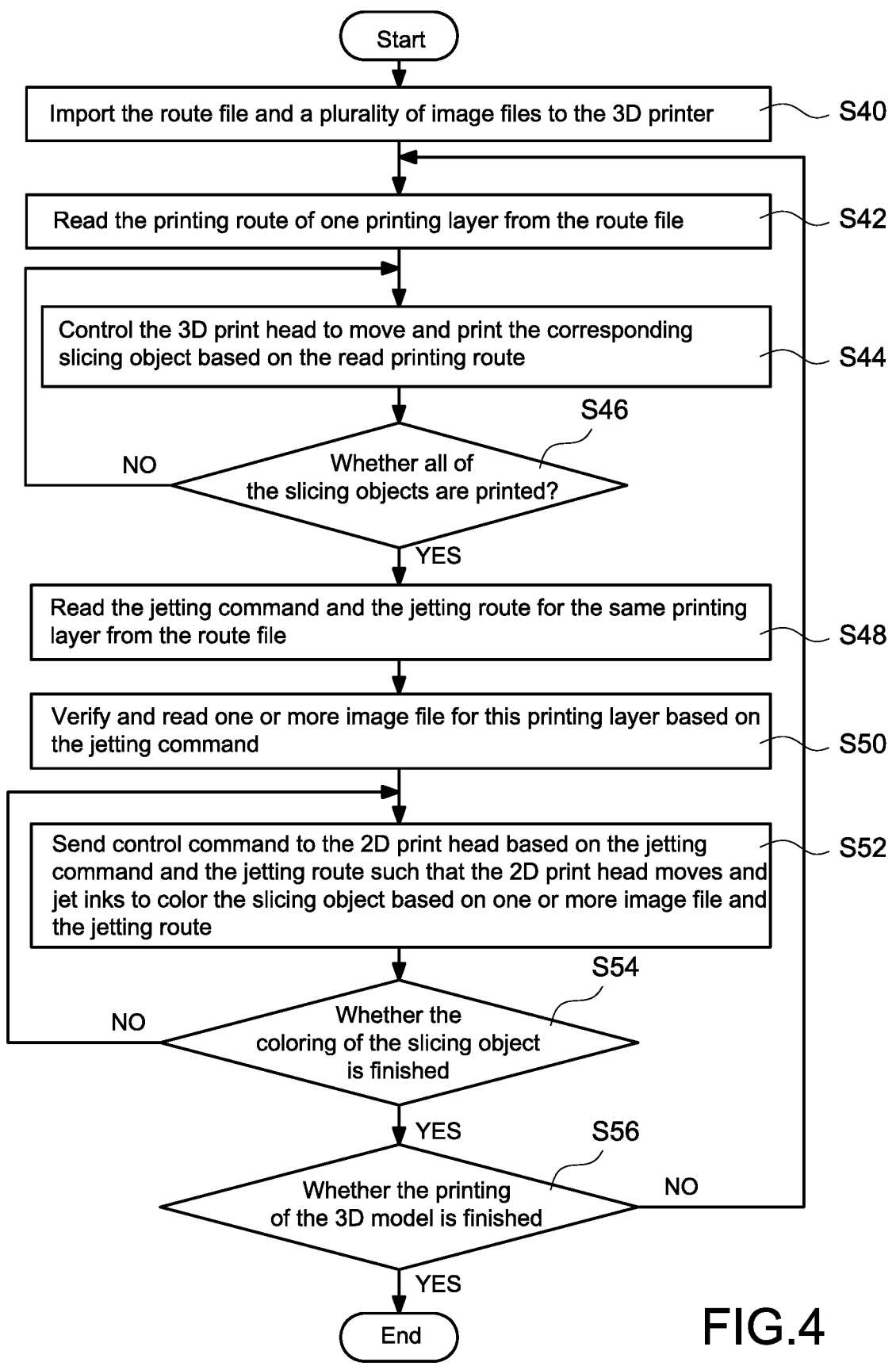
FIG. 4 is a printing flowchart according to the first embodiment of the present disclosure.

FIG. 4 is a printing flowchart according to the first embodiment of the present disclosure. When using the 3D printer 1 to print a 3D object, user needs to first import the corresponding route file 5 and a plurality of image files 6 for the 3D object to the 3D printer 1 (step S40).

In another embodiment, user may import the 3D file storing the 3D object to the 3D printer. The processor of the 3D printer 1 first performs slicing process for the 3D object to generate the route file 5 and the plurality of image files 6 for the 3D object. Then the 3D printer 1 performs the following printing operation. In another embodiment, user may first use other computer to perform the slicing process for the 3D object to generate the route file 5 and the plurality of image files 6 for the 3D object, and then user imports the route file 5 and the plurality of image files 6 to the 3D printer 1.

After step S10, the 3D printer 1 reads the printing route 51 of one printing layer (such as the first printing layer) in step S42 and then controls the 3D print head 3 to move and print the corresponding slicing object based on the read printing route 51 (step S44). During printing, the 3D printer 1 continually determines whether the printing for the slicing object corresponding to the current printing layer is finished in step S46 and continually executes the step S44 before the slicing object is completely printed.

Figure 5A:
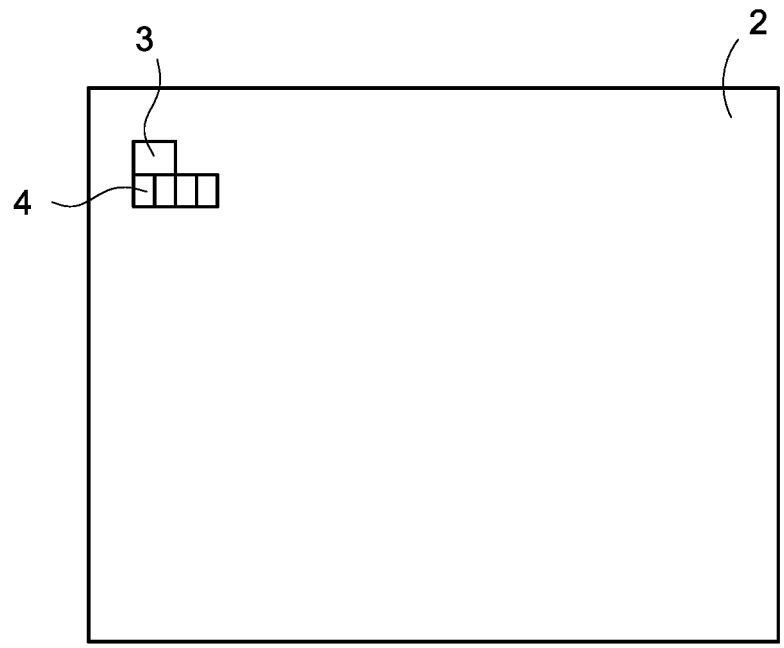
FIG. 5A shows the first printing operation according to the first embodiment of the present disclosure.
Figure 5B:
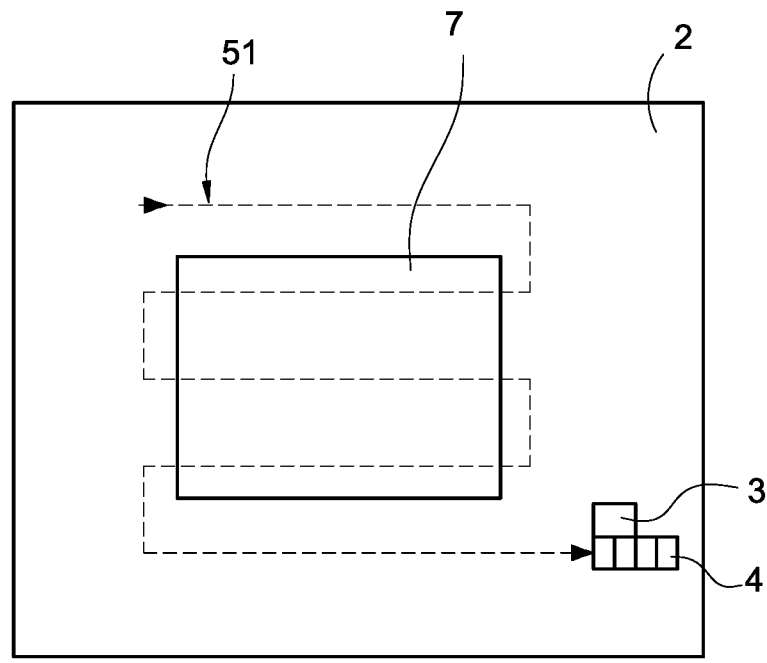
FIG. 5B shows the second printing operation according to the first embodiment of the present disclosure.

With reference together to FIG. 5A and FIG. 5B, those figures respectively show the first printing operation and the second printing operation according to the first embodiment of the present disclosure.

As shown in FIG. 5A, during printing the slicing object of a printing layer, the 3D printer 1 first controls the 3D print head 3 to move to a preset printing start point (printing origin). Then, as shown in FIG. 5B, the 3D printer 1 controls the 3D print 3 to move and extrude forming material based on the read printing route 51 in order to print the slicing object 7 corresponding to this printing layer.

With reference back to FIG. 4, after finishing the printing for the slicing object 7 corresponding to the current printing layer, the 3D printer 1 further reads the jetting command 52 and the jetting route 53 for the same printing layer from the route file 5 (step S48). Afterward, the 3D printer 1 verifies and reads one or more image files 6 for this printing layer based on the jetting command 52 (step S50). Therefore, the 3D printer 1 may send control command to the 2D print head 4 based on the jetting command 52 and the jetting route 53 such that the 2D print head 4 may move and jet ink to color the slicing object 7 based on the one or more image files 6 for this printing layer and based on the jetting route 53 (step S52).

During coloring operation, the 3D printer 1 continually determines whether the coloring of the slicing object 7 corresponding to the current printing layer is finished (step S54) and continually executes the step S52 before the coloring of the slicing object 7 corresponding to the current printing layer is finished.

Figure 5C:
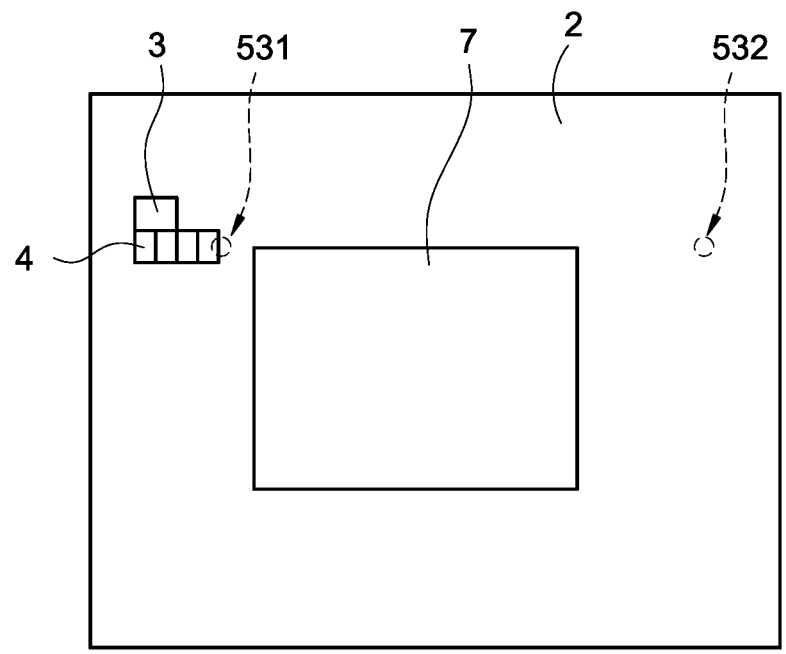
FIG. 5C shows the third printing operation according to the first embodiment of the present disclosure.
Figure 5D:
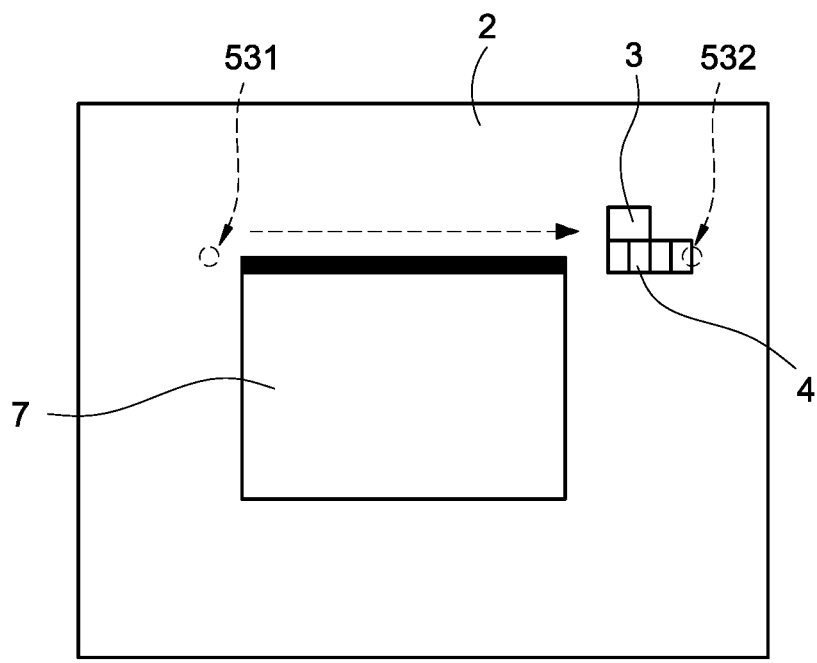
FIG. 5D shows the fourth printing operation according to the first embodiment of the present disclosure.

With reference together to FIG. 5C and FIG. 5D, those figures respectively show the third printing operation and the fourth printing operation according to the first embodiment of the present disclosure.

As shown in FIGS. 5C and 5D, during the coloring for the slicing object 7 corresponding to one current printing layer, the 3D printer 1 first controls the 2D print head 4 to move to the jetting origin 531 marked in the jetting route 53. Afterward, the 3D printer 1 controls the 2D print head 4 to move and jet ink based on one or more image files 6, until the 2D print head 4 moves to the jetting destination 532 marked in the jetting route 53.

If all of the image files 6 have the same size, during the coloring process, the 3D printer 1 may first control the 2D print head 4 to move to the preset printing origin and then control the 2D print head 4 to move and jet ink until the 2D print head 4 moves to the preset printing destination. In this embodiment, the route file 5 needs not store the jetting origin 531 and the jetting destination 532.

In this embodiment, the route file 5 already stores the jetting origin 531 and the ink jetting destination 532. Therefore, the 3D printer 1 will not have erroneous coloring process even though the image files 6 of each printing layer have different file seizes. The present disclosure can further save the storage space of the 3D printer 1 by generating image files 6 with different file seizes.

Refer back to FIG. 4, after the coloring for the slicing object 7 corresponding to this printing layer is finished, the 3D printer 1 further determines whether the physical 3D model corresponding to the 3D object is completely printed (step S56), namely whether the complete content of the route file 5 is read and executed.

In this embodiment, the route file 5 mainly records the slicing data for each printing layer based on the slicing order. Moreover, the 3D printer 1 reads the slicing data for each printing layer based on the slicing order, and performs printing and coloring for each printing layer based on the slicing order.

If the 3D printer 1 determines that the physical 3D model corresponding to the 3D object is not completely printed, then the 3D printer 1 re-executes steps S42 to S54 to continually read the slicing data for the next printing layer and performs printing and coloring for the next printing layer. If the 3D printer 1 determines that the physical 3D model corresponding to the 3D object is completely printed, then this printing process is finished.

As mentioned above, the 3D printer 1 performs printing for the 3D color model based on the slicing method of the present disclosure. The control and management of 3D print head 3 and 2D print head 4 for the 3D printer 1 can be optimized.

Besides, the slicing method of the present disclosure stores the ink-jetting related data for the 2D print head 4 in the route file 5 for the 3D print head 3. Therefore, if user only modifies the color of the 3D object while the structure and outer outline of the 3D object do not change, then the present discourse may directly update the ink-jetting related data in the route file 5 based on the modified color instead of re-performing 3D route slicing for the 3D object. Accordingly, the time spent for re-performing 3D route slicing after the 3D object is modified can be saved.

Figure 6:
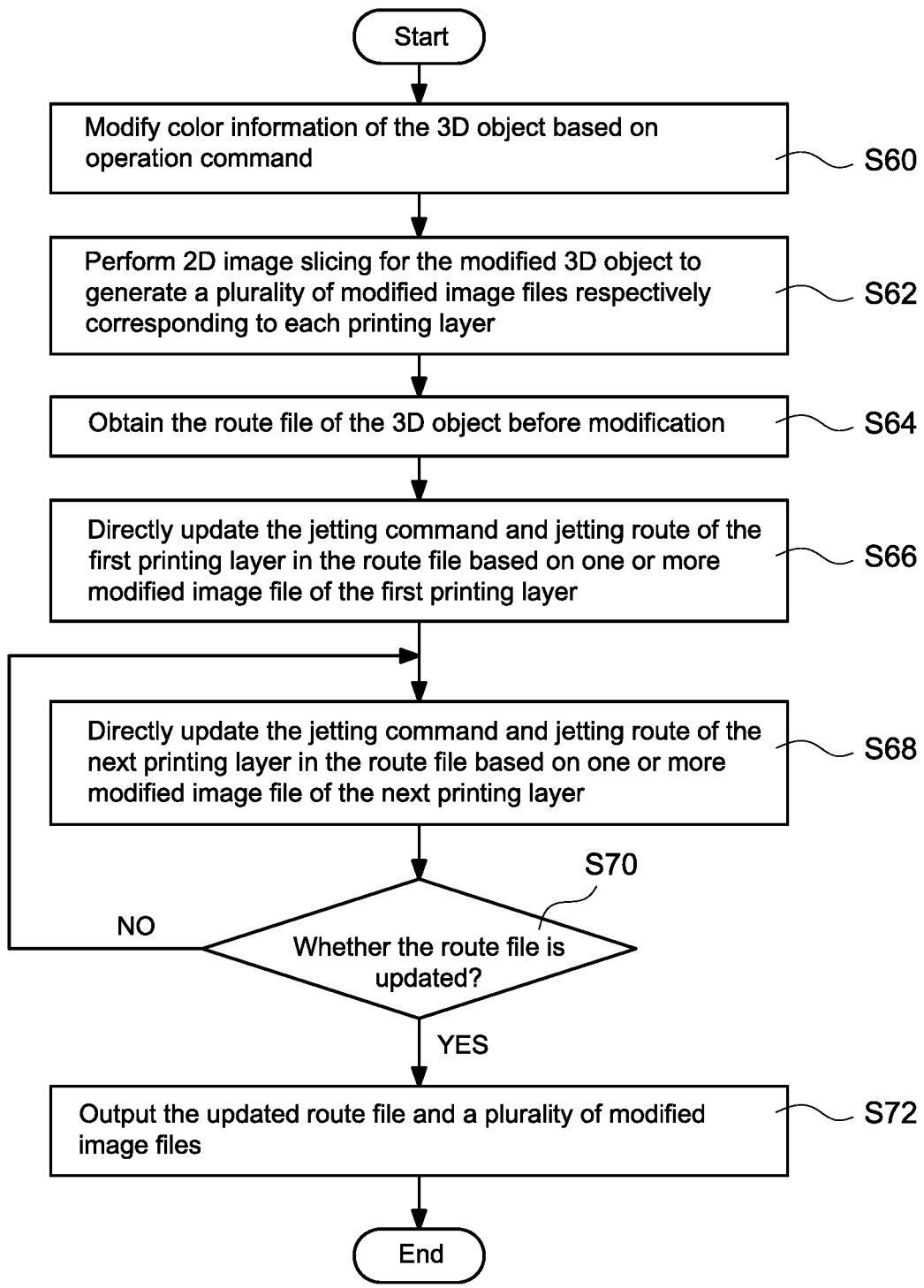
FIG. 6 is a flowchart showing the updating process for the first embodiment of the present disclosure.

FIG. 6 is a flowchart showing the updating process for the first embodiment of the present disclosure. The present disclosure further discloses an updating method for the slicing data of 3D colored object (hereinafter, updating method). More particularly, the updating method is mainly applied to the route file 5 generated by the above-mentioned slicing method.

If user wants to modify the color of the 3D object, he may perform operation through computer (for example, by operating the drawing software) to issue modification command. After receiving the modification command, the processor of the computer correspondingly modifies the color data (step S60) and then generated the modified 3D object. Moreover, the computer may store the modified 3D object in the above-mentioned 3D file to update the 3D file.

In related art, the processor needs to re-execute steps S12 and S14 in FIG. 2 if user modifies the color of the 3D object. Namely, the processor needs to re-execute 3D route slicing and 2D image slicing for the modified 3D object to generate the slicing data for the modified 3D object, it is time consuming for slicing.

In the present disclosure, the processor only needs to perform the above-mentioned 2D image slicing for the modified 3D object to generate a plurality of modified image files for each printing layer (step S62). Afterward, the processor obtains the route file 5 of the pre-modified 3D object (namely, obtain the route file 5 of the 3D object, which is output in step S30 of FIG. 2) in step S64, where the route file 5 stores the printing route 51, the jetting command 52 and the jetting route 53 for the pre-modified 3D object.

Afterward, based on one or more modified image files of one of the printing layer (for example, the first printing layer), the processor directly updates the jetting command 52 and the jetting route 53 for this printing layer (the first printing layer) in the route file 5 (step S66).

Afterward, following the slicing order and based on one or more modified image files of the next printing layer (for example, the second printing layer), the processor directly updates the jetting command 52 and the jetting route 53 for the next printing layer (the second printing layer) in the route file 5 (step S68).

During updating process, the processor continually determines whether the update for the route file 5 is finished (step S70) and continually executes step S68 before the update for the route file 5 is finished. Therefore, the processor may directly modify the jetting command 52 for each printing layer in the rout file 52 based on the slicing order and one or more modified image files of each printing layer.

If the processor determines that the update for the route file 5 is finished, then the processor outputs the updated route file and a plurality of modified image files (step S72). More particularly, the updated route file stores a plurality of printing routes 51 same as the above-mentioned route file 5 (because the structure and the outline of the 3D object are not changed), while the processor updates the jetting command 52 and the jetting route 53 for each printing layer based on the plurality of modified image files.

By using the updating method of the present disclosure, after the color of the 3D object is modified, the processor only needs to re-execute 2D image slicing (the 3D route slicing is not needed) to generate new (updating) route file 5, thus greatly saving the spent tome of re-executing 3D route slicing for processor.

Notably, in the steps S66 and S68, the processor mainly directly deletes the jetting command 52 of a printing layer from the route file 5 and then stores the jetting command of one or more modified image files for this printing layer into the corresponding data entry of the route file 5 to finish the updating for the route file 5.

For example, if the original color of the 3D object is black, the route file 5 has a corresponding data entry in one printing layer (for example, the tenth printing layer), which is stored with jetting command 52 "M801 K". If user modifies the color of the 3D object into cyan color through operation command, then the processor generates cyan image file 61 for the modified 3D object in step S62 of FIG. 6, namely, the cyan image file 61 is the modified image file. During updating the route file 5, the processor deletes the original jetting command "M801 K" in the tenth printing layer and stores the new jetting command "M801 C" in corresponding data entry.

To sum up, the present disclosure prevents from repeating 2D route slicing for the 3D object by updating the route file 5 with only the modifications of the 3D image files, the work load of the processor can be reduced and the spent time for re-executing the slicing can be saved.

Figure 7:
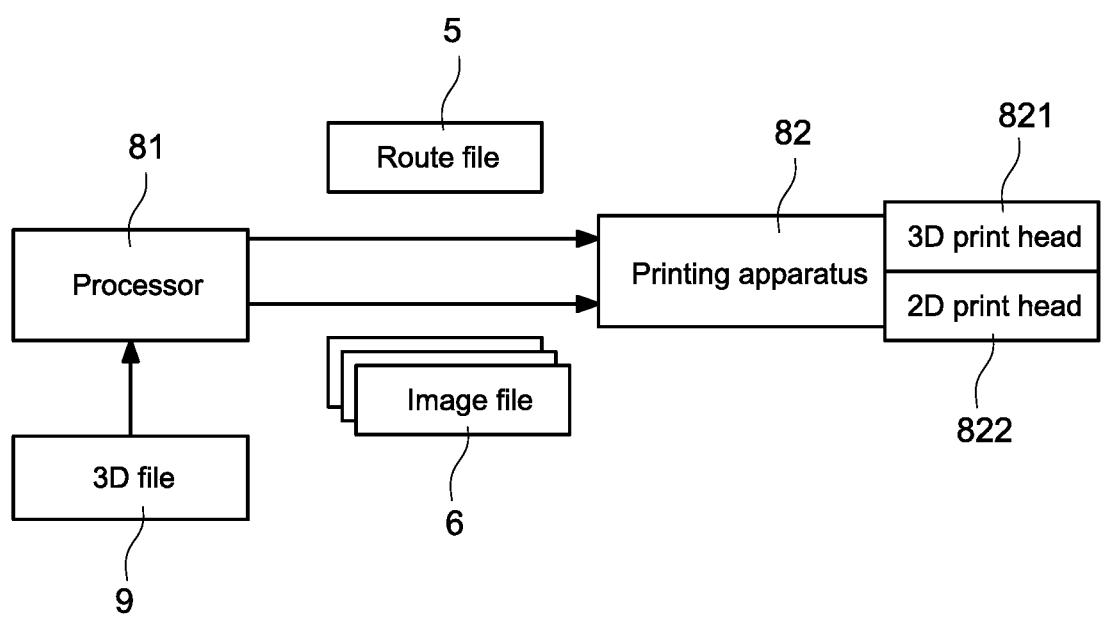
FIG. 7 is a schematic view showing the printing system according to the first embodiment of the present disclosure.

FIG. 7 is a schematic view showing the printing system according to the first embodiment of the present disclosure. The printing system 8 shown in FIG. 7 includes at least a processing device 81 to perform slicing for the 3D file 9 and a printing device 82 to perform printing based on the slicing data, where the processing device 81 and the printing device 82 may communicate with each other by wireless or wired communication. In one embodiment, the processing device 81 and the printing device 82 can be integrated into one unit (for example, the printing device 82 may be a 3D printer and the processing device 81 is a central processing unit of the 3D printer). The printing system 8 utilizes the slicing method of the present disclosure and performs printing operation and coloring operation through using the slicing data generated by the slicing method of the present disclosure.

The processing device 81 shown in FIG. 7 is similar to or the same as the above-mentioned processor. More particularly, the processing device 81 may import the 3D file 9 to be processed. The processing device 81 then performs 3D route slicing for the 3D object (not shown) stored in the 3D file in order to generate a plurality of printing routes corresponding to the printing layers, and simultaneously performs 2D image slicing for the 3D object in order to generate a plurality of image files 6 corresponding to the printing layers.

After above-mentioned slicing operation is finished, the processing device 81 generates the above-mentioned route file 5 and stores the slicing data (including the printing routes, the jetting command including the plurality of image files 6, and the jetting route) for each slicing layer in corresponding entry of the route file (such as the route file 5 shown in FIG. 3) based on the slicing order.

After the route file 5 and the plurality of image files 6 are generated, the processing device 81 finishes the slicing operation and imports the route file 5 and the plurality of image files 6 into the printing device 82. Therefore, the printing device 82 may print the physical 3D model corresponding to the 3D object based on the route file 5 and the plurality of image files 6.

The printing device 82 shown in FIG. 7 is similar to or the same as the 3D printer 1 shown in FIG. 1. More particularly, during printing operation, the printing device 82 first controls the 3D print head 821 thereon to move to a preset printing origin (printing start point) and then reads the printing route of one printing layer (such as the first printing layer). Afterward, the printing device 82 control the 3D print head 821 to move and print (for example, extruding forming material on the printing platform) based on the read printing route, thus generate the slicing object of the first printing layer.

Notably, the route file 5 generated by the slicing method of the present disclosure is mainly used to control the movement path of the 3D print head 821 of the printing device 82. Therefore, any 3D printer, which is equipped with 3D print head and performs printing operation involving movement of 3D print head, can use the route file 5 generated by the slicing method of the present disclosure. In other word, the printing device 82 is not limited to the FDM 3D printer 1 shown in FIG. 1.

After the printing operation for the first printing layer is finished, the printing device 82 obtains the jetting command and jetting route from the same printing layer (such as the first printing layer) in the same route file 5, and then verifies and reads one or more image files 6 for the first printing layer based on the content of the jetting command.

Afterward, the printing device 82 controls the 2D print head 822 thereon to move to a jetting origin (jetting start point) marked in the jetting route, and then the printing device 82 controls the 2D print head 822 to move and ink jet based on one or more image files 6 of the first printing layer until the 2D print head 822 moves to a jetting destination marked in the jetting route. The printing device 82 determines that the coloring operation of the first printing layer is finished when the 2D print head 822 moves to a jetting destination marked in the jetting route.

After the coloring operation of the first printing layer is finished, the printing device 82 reads the next data entry in the same route file to perform printing and coloring for the next printing layer (such as the second printing layer) until the physical 3D model is completely printed. More particularly, the printing device 82 performs the printing and coloring for each of the printing layers based on the slicing order.

Notably, if the color of the 3D object is modified, the updating method of the present disclosure re-executes 2D image slicing for the 3D object and updates the jetting command for the same route file such that the printing system 8 of the present disclosure can directly perform the printing and coloring operation based on the updated route file.

Thus, particular embodiments have been described. Other embodiments are within the scope of the following claims. For example, the actions recited in the claims may be performed in a different order and still achieve desirable results.

What is claimed is:

1. A slicing method for three-dimensional (3D) colored object, the slicing method comprising:
   a) importing a 3D file (9) through a processor, the 3D file (9) storing a 3D object;
   b) the processor performing a 3D route slicing for the 3D object to generate a plurality of printing routes (51) corresponding to a plurality of printing layers;
   c) the processor performing a 2D image slicing for the 3D object to generate a plurality of image files (6) corresponding to the plurality of printing layers, where each of the printing layers is corresponding to one or more image files (6);
   d) the processor storing the printing route (51) of one of the printing layers in a route file (5); and
   e) after the step d), the processor storing a jetting command (52) for one or more image files (6) of the one of the printing layers in the route file (5), and storing a jetting route (53) of the one of the printing layers in the route file (5).

2. The slicing method in claim 1, wherein in the step c), the processor generates the jetting route (53) of each of the printing layers based on a dimension of the one or more image files (6) corresponding to the printing layer.

3. The slicing method in claim 2, wherein in the step c), the processor determines a jetting range for each of the printing layers based on a content of one or more image files (6) corresponding to the printing layer, and the processor sets the jetting route (53) of each of the printing layers based on each of the jetting ranges.

4. The slicing method in claim 1, wherein in each of the jetting routes (53) comprises a jetting origin (531) and a jetting destination (532) for one or more image files (6) corresponding to each of the printing layers.

5. The slicing method in claim 4, wherein the each of the jetting routes (53) further comprises a jetting movement speed for each of the printing layers.

6. The slicing method in claim 1, wherein the plurality of image files (6) respectively stores a layer-number mark, in the step e), the processor further stores a jetting height of the printing layer in the route file (5), wherein the jetting height is corresponding to the layer-number mark of one or more image files in this printing layer.

7. The slicing method in claim 1, wherein each of the printing layers is corresponding to at most four image files (6), where the four image files (6) includes a cyan image file (61), a magenta image file (62), a yellow image file (63), and a black image file (64).

8. The slicing method in claim 1, wherein the route file (5) is a G-code file.

9. An update method for slicing data of a 3D colored object, the update method applied to the route file (5) generated by the slicing method of claim 1 and comprising:
   a) the processor receiving a modification command to modify a color data of the 3D object and to generate a modified 3D object;
   b) the processor performing the 2D image slicing for the modified 3D object to generate a plurality of modified image files (6) for the plurality of printing layers, wherein each of the printing layers is corresponding to one or more modified image files (6);
   c) the processor obtaining the route file (5) for the 3D object;
   d) the processor updating the jetting command (52) and the jetting route (53) in the route file (5) based on one or more modified image files (6) for one of the printing layers;
   e) after the step d), the processor determining whether data of all printing layers in the route file (5) are updated;
   f) before the data of all printing layers in the route file (5) are updated, the processor performing the step d) for next printing layer based on a slicing order;

g) after the data of all printing layers in the route file (5) are updated, the processor outputting the updated route file (5) and the plurality of modified image files (6).

10. The update method in claim 9, wherein in the step d), the processor updates the route file (5) by deleting the jetting command (52) of the printing layer in the route file (5) and storing the jetting command (52) of one or more modified image files (6) for the printing layer in corresponding data entry of the route file (5).

11. A printing system (8) using the slicing method of claim 1, the printing system (8) comprising:
- a processing device (81) configured to import a 3D file (9) storing a 3D object, the processing device (81) configured to perform 3D route slicing for the 3D object to generate a plurality of printing routes (51) respectively corresponding to the plurality of printing layers, and to perform a 2D image slicing for the 3D object to generate a plurality of image files (6) corresponding to the plurality of printing layers, the processing device (81) configured to store the printing route (51) of one of the printing layers in a route file (5), and store a jetting command (52) of one or more image files (6) for the one of the printing layers in the route file (5), and store a jetting route (53) of the one of the printing layers in the route file (5); and
- a printing device (82) having communication with the processing device (81), the printing device (82) having a 3D print head (821) and a 2D print head (822),
- wherein in a printing operation, the printing device (82) is configured to read the printing route (51) for the printing layer from the route file (5) and to control the 3D print head (821) to move and print based on the printing route (51) such that a slicing object (7) corresponding to the printing layer is generated;
- wherein in a coloring operation, the printing device (82) is configured to read the jetting command (52) and the jetting route (53) for the printing layer from the route file (5) and to verify and read one or more image files (6) for the one of the printing layers based on a content of the jetting command (52), the printing device (82) is configured to control the 2D print head (822) to jet ink and to move to a ink-jetting destination (532) marked in the jetting route (53) based on one or more image files (6) for the one of the printing layers.

12. The printing system in claim 11, wherein the processing device (81) is configured to store the printing route (51) for each printing layer of the 3D object, the jetting command (52) for one or more image files (6) and the jetting route (53) in the route file (5) based on a slicing order, wherein the printing device (82) is configured to read the route file (5) based on the slicing order to perform the printing operation and the coloring operation for each printing layer.

13. The printing system in claim 11, wherein the processing device (81) is configured to generate the jetting route (53) of each of the printing layers based on a dimension of one or more image files (6) corresponding to the printing layer, or the processing device (81) is configured to determine a jetting range for each of the printing layers based on a content of one or more image files (6) corresponding to the printing layer, and set the jetting route (53) of each of the printing layers based on each of the jetting ranges.

14. The printing system in claim 11, wherein the processing device (81) is configured to store a jetting movement speed for each of the printing layers in the route file (5), the printing device (82) is configured to control a movement speed of the 2D print head (822) during the coloring operation based on the jetting movement speed.

15. The printing system in claim 11, wherein the plurality of image files (6) respectively stores a layer-number mark, the processing device (81) is configured to store a jetting height of the printing layer in the route file (5), wherein the jetting height is corresponding to the layer-number mark of one or more image files (6) in this printing layer.

* * * * *